United States Patent Office 3,228,201
Patented Jan. 11, 1966

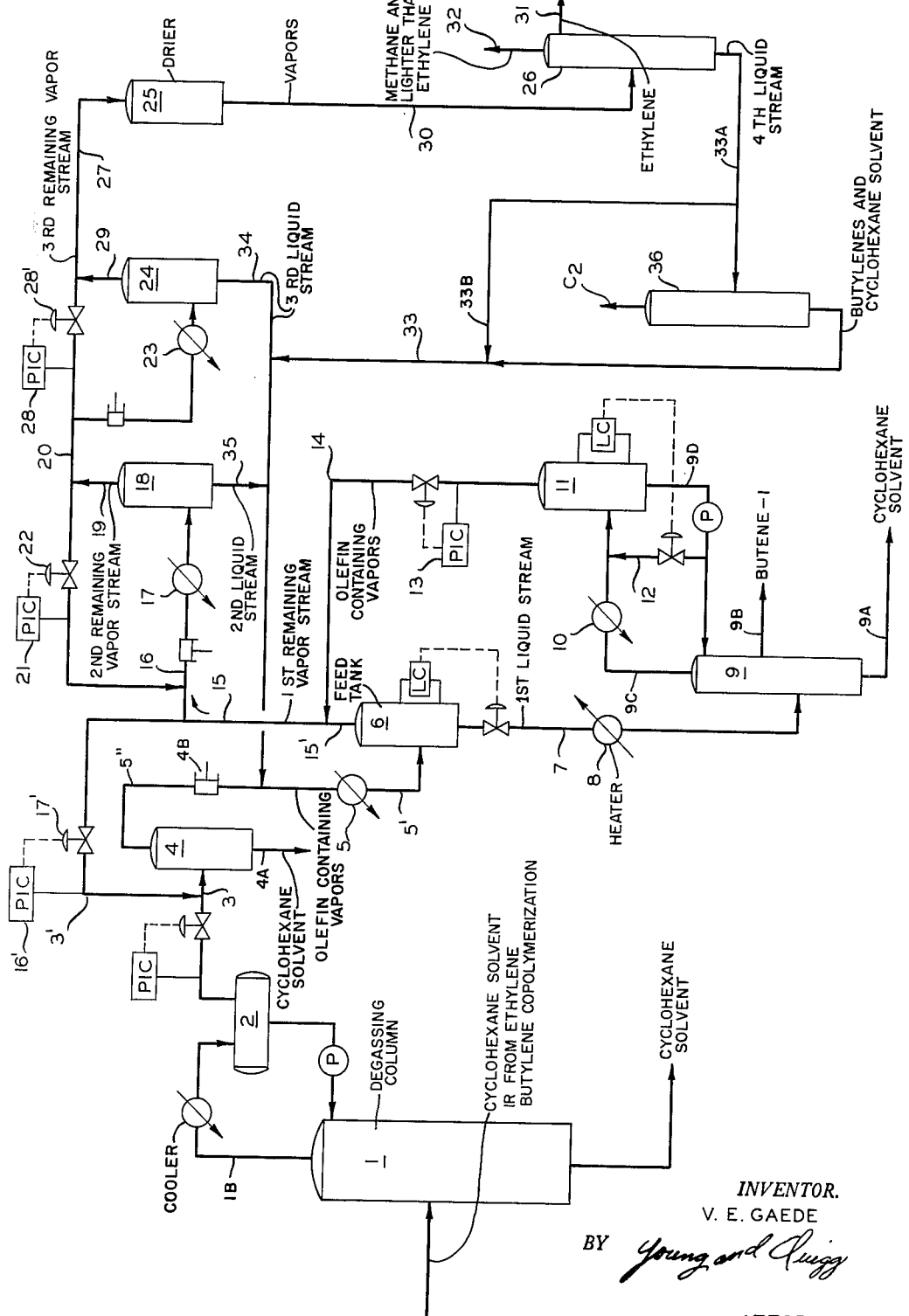

3,228,201
RECOVERY OF OLEFIN
Virgil E. Gaede, Pasadena, Tex., assignor to Phillips Petroleum Company, a corporation of Delaware
Filed Oct. 6, 1961, Ser. No. 143,511
10 Claims. (Cl. 62—23)

This invention relates to the recovery of an olefin from a stream containing the same. In one of its aspects, the invention relates to the recovery of an olefin from a gas derived from a polymerization of an olefin, in which polymerization, a solvent is employed by compressing and cooling the gas stream to remove any entrained solvent and material higher boiling than the olefin to be recovered therefrom in a first separation step practiced on said stream, then further compressing and cooling vapors thus obtained, and then further cooling and condensing the separation of liquid and, finally, fractionating the remaining gaseous stream, which in the case of the recovery of ethylene from a polymerization of ethylene operation, will contain some methane and ethylene, the ethylene being the olefin sought to be recovered.

In another of its aspects, the invention relates to steps, as described, in combination with the treatment of liquid separated after the first compressing and cooling to recover some solvent and olefin boiling higher than the olefin sought to be recovered, in the case of the recovery of ethylene, the higher-boiling olefin being butylene, a butylene-recovery being practiced upon the first separated liquid and upon the second separated liquid, as well as upon a third separated liquid, as herein more fully set forth and described.

In the production of polymers and copolymers of low molecular weight hydrocarbons, for example, polymers and copolymers of ethylene and other 1-olefins, some of the reactant olefins pass off as a component of a gaseous overhead when solvent which is employed in the polymerization operation is degassed. Thus, when the solvent which is used in a polymerization reactor is being purified by degassing the same, there results a stream containing an olefin which, according to this invention, is to be recovered.

An object of this invention is to recover an olefin. Another object of this invention is to recover an olefin from an off-gas obtained when a solvent used in the polymerization or in the copolymerization of olefins, such as a 1-olefin, is degassed. It is a further object of this invention to provide a combination of steps in a unitary operation with which to recover an olefin, as described, and to also recover, simultaneously, from the operation, at least one other olefin which finds its way into the off-gas mentioned herein, such as butylene or another olefin to be copolymerized with said first-mentioned olefin to be recovered. It is a still further object of the invention to recover methane from said off-gas.

Other aspects, objects and the several advantages of this invention are apparent from a study of this disclosure, the drawing and the appended claims.

According to the present invention, there is provided a method of recovering ethylene and butylene from a solvent in which a copolymerization of ethylene and butylene has been effected and in which solvent, there remains unreacted gases, a method comprising the steps of degassing said solvent obtaining an off-gas containing ethylene, butylene, ethane and methane, as well as solvent; partially liquefying said off-gas obtaining a liquid stream containing traces of the lighter gases, butylene and solvent, and a vapor stream containing substantial quantities of ethylene and some lighter gases; separating the liquid stream into a solvent stream, butylene stream and an overhead stream containing substantially all of the ethylene and lighter gases; returning the overhead to the partial liquefying step recited herein; and passing said vapor stream to further treatment to recover ethylene therefrom. Further, according to the invention in the further treatment, further liquefying and vapor separation steps are practiced. Thus, the invention in at least one additional, but preferably at least two additional, liquefying and vapor separation steps ultimately produces an ethylene-containing gas from which methane and ethane are separated and a liquid stream containing butylene which is returned for further treatment in the initial liquefying step.

In a specific embodiment of the present invention, as shown in the drawing, as it is applied to the recovery of ethylene-butylene, ethane, methane and solvent from an off-gas resulting from a degassing of a cyclohexane solvent, several liquefaction and vapor separation steps are practiced upon a solvent used in the copolymerization of ethylene and butylene to form a copolymer, for example, as described in U.S. Patent No. 2,825,721, issued March 4, 1958, Hogan and Banks, the steps comprising degassing the solvent obtaining a gaseous or vaporous phase, treating said gaseous phase in a system of zones wherein said phase is partially liquefied, a first liquid obtained is fractionated to recover therefrom a solvent-containing stream, a butylene-containing stream, a vapor containing ethylene and some butylene, a now first remaining vapor stream is liquefied, a second liquid stream obtained is treated as is said first liquid stream, a now second remaining vapor stream is liquefied, a third liquid obtained is treated as said first and said second liquid streams are treated, a now third remaining vapor stream is dry, is passed to a fractionatioin zone, and therein is separated into a fourth liquid stream which is treated for recovery of ethylene therefrom, said fourth liquid stream is treated as said first, second and third liquid streams are treated, a stream of ethylene and a stream containing lighter than ethylene, e.g., ethane, and methane.

A particularly advantageous feature of the plural steps, specificially of the recited steps of liquefaction and separation of this invention, to obtain a liquid containing butylene, is that the ethylene is recovered effectively and relatively economically because no effort is required to perform fractionations of high order of efficiency until the fractionation step practiced upon the last remaining vapor stream, which preferably is dried and when dried, is dried only at this stage of the operation and not before. One skilled in the art in possession of this disclosure, having studied the same, will recognize the economy which can be practiced by the specific arrangement of the steps embodying the several concepts of the invention.

A feature of the invention is in the scheme or combination of the several recited liquid streams for treatment to recover therefrom additional quantities of desirable components therein as indicated to one skilled in the art having studied this disclosure and the table of data herein. The concept of the return of the relatively roughly separated liquid streams is more fully described in connection with the drawing of an embodiment of the invention and is a basic element of the general invention which makes such a return.

Also, according to the present invention, there is made possible the advantageous recovery of desirable fractions, of such gases and vapors as herein treated, by a combination of zones so controlled as to obtain, according to a further concept basic to the invention, a flow of streams, all the while, maintaining highly advantageous pressure relationships throughout the system which, briefly, result in that the several vapor streams automatically and simply are pressure-relieved, respectively, all of them upstream of each of all the compressors in the system from which they stem, permitting, however, the maintaining of the vapor streams, pressure for operational purposes, as desired.

In the drawings, cyclohexane solvent enters column 1 by pipe 1A and is degassed in column 1. The uncondensed vapors leaving column 1 by pipe 1B pass to accumulator 2 and from accumulator 2 pass through line 3 and into separator 4, from the bottom of which some additional solvent is removed by pipe 4A. The gases leave from separator 4 by pipe 5″, are compressed by compressor 4B, passed through heat exchanger 5 and into feed tank 6 through line 5′. The liquid from feed tank 6 is passed through line 7, heat exchanger 8 and into a packed fractionation column 9. Solvent is removed as a kettle product from column 9 by pipe 9A and is purified before it is used. From a point above the feed entry of column 9, a stream of butene-1 is removed by pipe 9B. The overhead vapors from column 9 are passed by pipe 9C through a heat exchanger 10 and into a reflux accumulator 11. The liquid from reflux accumulator 11 is passed back into column 9 by pipe 9D. A liquid level control on accumulator 11 controls the rate of flow of liquid recycled through line 12 back into accumulator 11. PIC 13 controls the rate of removal of vapors from accumulator 11. The vapors from accumulator 11 are passed through line 14 and are added to the vapors from tank 6 that are passing through line 15′. If the pressure in line 3 decreases to that of a predetermined value, PIC 16′ opens motor valve 17′ and allows vapors to be recycled through line 3′ into line 3.

Vapors pass from line 15 into line 16 and are compressed and passed through heat exchanger 17 and into liquid vapor separator 18. Liquid removed from the bottom of separator 18 by line 35 is recycled by line 34 through heat exchanger 5. The vapors from separator 18 pass through line 19 into line 20. If the pressure in line 16 becomes less than a predetermined value, PIC 21 opens motor valve 22 and allows vapors to be recycled back into line 16. Vapors from separator 18 that pass through line 20 are compressed and passed through heat exchanger 23 and then into vapor liquid separator 24. The vapor from separator 24 may be recycled into line 20 if the pressure in line 20 becomes less than that of a predetermined value by action of PIC 28 opening motor valve 28′ in line 29, into which vapor passes from separator 24. The vapor from separator 24 is passed through line 27 to drier 25 and then by line 30 into a packed fractionation column 26. Ethylene is withdrawn from the column from a point 31 above the feed entry and lighter gases, including methane, are removed as an overhead product by line 32. The kettle product from fractionator 26 along with the liquid from separator 24 are added to the liquid from separator 18 by lines 33 and 34. If desired, the kettle product can be flashed or further fractionated for clean-up purposes in fractionator 36 to recover additional olefins, e.g., to remove lowest boiling hydrocarbon ethane therefrom.

Generally, there will be no liquid removed in separators 18 and 24, but their provision is important to remove any condensate which may possibly form under abnormal conditions and prevent same from passing into the next compressor.

EXAMPLE

The following example is read together with the drawing.

[Compositions Given in Percent]

|  | Column 6 | | Butylene Column (9) | | | |
|---|---|---|---|---|---|---|
|  | Feed (5′) | Overhead (15′) | Feed (7) | Overhead (14) | Side draw | Bottoms |
| Methane | 1.5 | 6.3 | 0.3 | 1.8 | | |
| Ethane | 16.8 | 39.7 | 11.1 | 53.7 | 0.3 | |
| Ethylenes | 10.4 | 29.7 | 5.6 | 26.4 | 0.5 | |
| Butylene | 49.4 | 23.4 | 55.9 | 18.1 | 97.6 | 5.4 |
| Cyclohexane | 21.8 | 0.9 | 27.1 | | 1.6 | 94.6 |

|  | Ethylene clean-up column (26) | | | |
|---|---|---|---|---|
|  | Feed (30) | Overhead (32) | Side draw (31) | Bottoms |
| Methane | 1.1 | 16.4 | .4 | |
| Ethane | 47.4 | | 7.4 | 64.5 |
| Ethylene | 29.2 | 83.6 | 92.2 | 4.1 |
| Butylenes | 21.8 | | | 30.7 |
| Cyclohexane | .5 | | | .7 |
|  | 100.0 | 100.0 | 100.0 | 100.0 |

[Temperatures and Pressures]

| | Column (1) | Feed Tank (6) | Column (9) | Tank (11) |
|---|---|---|---|---|
| Top | 30 p.s.i.a. 210° F. | 86 p.s.i.g. 50° F. | 110 p.s.i.g. 135° F. | 110 p.s.i.g. 50° F. |
| Bottom | 180° F. | | 325° F. | |
| Feed | | | 200° F. | |
| Side draw | | | 140° F. | |

| | Tank 18 | Tank 24 | Column 26 |
|---|---|---|---|
| Top | 200 p.s.i.g. 100° F. | 400 p.s.i.g. 100° F. | Top—355 p.s.i.a. Bottom—360 p.s.i.a. Top—30° F. Side draw—8° F. Bottom—+20° F. |

One skilled in the art in possession of this disclosure having studied the same will recognize that there are advantages additional to those which have been described which, from a different viewpoint, are extremely important. Thus, the invention lends itself to lower energy consumption and smaller equipment. In the case of degassing of solvent, as here described in connection with production of polyolefin, especially a copolymer of polyethylene and butylene, the degassing stream here treated is the smallest stream in the plant which has a high concentration of $C_4$ hydrocarbons. Thus, other than losses, all $C_4$'s must leave the system from this stream. Therefore, it is of the essence of the several concepts of the invention that $C_4$ hydrocarbons are recovered from the overall operation of produced polyolefins by treating the smallest stream in the plant. This can be contrasted with other operations in which streams of high volume and relatively much lower concentration of $C_4s'$ are treated by methods other than that of the present invention. Further, down time of the equipment which is used according to the invention does not affect the overall polyolefin plant operation.

It will be understood by those skilled in the art that the embodiment herein described is for illustrative purposes only and that details of steps and equipment which one skilled in the art can routinely supply having studied this disclosure have been omitted for sake of simplicity.

Reasonable variation and modification are possible within the scope of the foregoing disclosure, drawing and the appended claims to the invention, the essence of which is that there have been provided a method and an apparatus or system wherein the gases or vapors resulting from the degassing of a solvent used in the polymerization of olefins are advantageously treated to recover valuable olefins therefrom by a series of liquefactions and vapor separations to obtain a final vapor which is fractionated to produce therefrom an olefin which can be again subjected to polymerization conditions, wherein there can be practiced a treatment effected upon a series of liquid streams obtained in said series of liquefactions and vapor separations; wherein advantageously, the vapor streams and their pressures are adjusted optimally to yield the desired product by recycling to the low pressure side of each compressor, compressed vapors stemming therefrom and to the low pressure side of all of the compressors all vapors in excess of the desired forward flow amount of them through the system, as described in connection with the example of an embodiment, as shown in the drawing in connection with the recovery of gases from a solvent used in the copolymerization of ethylene and butylene; and wherein especially importantly the recovery of olefins is practiced upon the smallest stream containing the highest concentration of the comonomer, for example, butylene.

I claim:

1. A method of recovering valuable olefin from an off-gas resulting from a degassing of a solvent employed in the polymerization of an olefin to form a polyolefin which comprises in a combination of steps, passing said solvent which has been employed as recited herein to a degassing zone thus obtaining an off-gas, partially liquefying the off-gas to liquefy vaporous components therein, obtaining a now first remaining vapor stream and a solvent stream, liquefying partially said vapor stream, obtaining a now second remaining vapor stream, liquefying said second remaining vapor stream, obtaining a now third remaining vapor stream, and passing said third remaining vapor stream to a fractionation zone, in said zone, separating a stream of olefin, and collecting and treating in a common zone all liquid fractions obtained from each of said liquefactions, thereby recovering additional valuable olefin and vapors for retreatment as herein described.

2. A method of obtaining valuable olefin from a vapor-containing stream obtained upon the degassing of solvent used in the polymerization of an olefin to form a polyolefin which comprises in a combination of steps in a system of zones, passing said solvent which has been used as recited herein to a degassing zone thus obtaining said solvent-containing stream, the partial liquefaction of said vapor, obtaining a first liquid, fractionating said first liquid to recover therefrom a solvent-containing stream, and a vapor stream containing olefin, treating a now first remaining vapor stream to liquefy a portion of the same, obtaining a second liquid stream and treating the said second liquid stream as is said first liquid stream, treating a now second remaining vapor stream to liquefy the same, obtaining a third liquid stream, treating said third liquid stream as said first and second liquid streams are treated, treating a now third remaining vapor stream in a fractionation zone to separate therefrom a fourth liquid stream which is treated as said first, second and third liquid streams are treated, and a stream of olefin as a desired product of the method.

3. A method according to claim 2 wherein said fourth liquid stream is further fractionated prior to its treatment as said first, second and third liquid streams are treated to recover therefrom a stream of the lowest-boiling hydrocarbon therein contained.

4. A method for the recovery of olefin such as ethylene, butylenes, ethane and methane, as well as solvent from an off-gas resulting from a degassing of a solvent such as cyclohexane used in the polymerization of ethylene to form polyethylene, which is characterized in that a gaseous or vaporous phase resulting upon the degassing of the used solvent is treated in a combination of steps in the system of zones wherein said phase is partially liquefied, a first liquid obtained is fractionated to recover therefrom a solvent-containing stream, a butylene-containing stream, and a vapor stream containing ethylene and some butylene, a now first remaining vapor stream is liquefied, a second liquid stream obtained is treated as is said first liquid stream, a now second remaining vapor stream is liquefied, a third liquid obtained is treated as said first and said second liquid streams are treated, a now third remaining vapor stream is passed to a fractionation zone and therein is separated into a fourth liquid stream, which is treated for recovery of $C_2$ hydrocarbon therefrom and which is then treated as said first, second and third liquid streams are treated, a stream of ethylene, and a stream containing lighter than ethylene.

5. A method according to claim 4 wherein each stream is liquefied employing a compressor and wherein, upon separation to obtain each remaining vapor stream, vapor in excess of that desirably treated in each ensuing step is returned ahead of each compressor from which it has resulted and ahead of each of all of the compressors in the system.

6. A method of recovering ethylene and butylene from a solvent in which a copolymerization of ethylene and butylene has been effected and in which solvent there remains unreacted gases, the steps comprising degassing said solvent obtaining an off-gas containing ethylene, butylene, ethane and methane, and solvent, partially liquefying said off-gas obtaining a liquid stream containing traces of the lighter gases, butylene and solvent and a vapor stream containing substantial quantities of ethylene and some lighter gases, separating the liquid stream into a solvent stream, a butylene stream and an overhead stream containing substantially all of the ethylene and lighter gases, returning the overhead to the partial liquefying step recited herein, and passing said vapor streams to further treatment to recover ethylene therefrom.

7. A method of recovering olefins from a vapor-containing stream obtained upon degassing cyclohexane solvent employed in the polymerization of ethylene which comprises compressing and cooling said vapor-containing stream, thus obtaining a partial liquefaction thereof, separating a liquid stream and treating the same to obtain solvent, a butylene-containing stream, and a vapor-containing stream therefrom, combining said last-mentioned vapor stream and a vapor stream obtained upon said partial liquefaction and passing said combined vapor stream to further liquefaction and fractionation to recover at least ethylene therefrom.

8. A method according to claim 7 wherein the combined vapors last mentioned are further at least partially liquefied resulting in a vapor stream from which ethylene is obtained and in a liquid stream which is returned and combined with said first-mentioned at least partially liquefied stream.

9. A method for the recovery of olefins and solvent from off-gas obtained when degassing a cyclohexane solvent which has been used for the polymerization of ethylene, the said off-gas containing methane, ethane, ethylene, butylene and cyclohexane, which comprises compressing said gas to pressure of the order of 85 pounds per square inch gauge at a temperature of the order of approximately 50° F., thereby obtaining a liquid phase, separating said liquid phase from a remaining vapor phase, treating said remaining vapor phase for the recovery of olefin therefrom, treating said liquid phase in a fractionation zone to obtain therefrom, a solvent bottoms, a butylene sidestream, and an overhead containing a minor proportion of methane, a somewhat larger but still minor proportion of ethane, a still larger but still minor proportion of ethylene, and a substantial proportion of butylene, and combining said overhead with said vapor phase which is treated for the recovery of olefin therefrom.

10. A method according to claim 9 wherein the olefin is recovered from the combined vapor phases by compressing the same to a pressure of the order of 200 pounds per square inch gauge and a temperature of the order of approximately 100° F., obtaining a liquid phase and a vapor phase, returning said liquid phase for treatment at said pressure of the order of 85 pounds per square inch gauge and said temperature of the order of approximately 50° F., passing the last vapor phase obtained into a zone maintained at approximately the pressure of the order of 400 pounds per square inch gauge and a temperature of the order of approximately 100° F., obtaining a vapor and a liquid phase, separating the liquid phase and returning the same for treatment in said zone at said pressure of the order of 85 pounds per square inch gauge and said temperature of the order of approximately 50° F., treating the last-mentioned vapor phase to dry the same, passing said vapor phase to a fractionating zone maintained at a pressure of the order of approximately 355 pounds per square inch absolute at its bottom and at a pressure of the order of approximately 360 pounds per square inch absolute at its top, a bottom temperature of the order of −20° F., a sidedraw temperature of the order of approximately −8° F. and a top temperature of the order of −50° F., recovering from said fractionating zone an overhead containing methane and ethane and some ethylene, obtaining from said sidedraw, a stream containing essentially ethane, ethylene, and some butylene, and a bottoms stream containing largely butylene and cyclohexane, as well as some ethane.

References Cited by the Examiner
UNITED STATES PATENTS

| | | |
|---|---|---|
| 2,469,724 | 5/1949 | Gross. |
| 2,497,421 | 2/1950 | Shiras _____ 62—27 XR |
| 2,705,698 | 4/1955 | Hamner _____ 62—28 XR |
| 2,765,635 | 10/1956 | Redcay. |
| 2,817,961 | 12/1957 | O'Connell _____ 62—23 |
| 2,825,721 | 3/1958 | Hogan et al. __ 260—683.15 XR |
| 2,880,592 | 4/1959 | Davison _____ 62—23 XR |
| 2,916,888 | 12/1959 | Cobb. |
| 2,938,934 | 5/1960 | Williams. |

NORMAN YUDKOFF, *Primary Examiner.*

ALPHONSO D. SULLIVAN, *Examiner.*